(12) United States Patent
Abura et al.

(10) Patent No.: US 9,032,997 B2
(45) Date of Patent: May 19, 2015

(54) FLUID COUPLING

(75) Inventors: Yoshinori Abura, Osaka (JP); Katsuya Ishibe, Osaka (JP); Atsushi Moriiki, Osaka (JP)

(73) Assignee: Nagahori Industry Co., Ltd., Osaka (JP)

( * ) Notice: Subject to any disclaimer, the term of this patent is extended or adjusted under 35 U.S.C. 154(b) by 17 days.

(21) Appl. No.: 13/813,262

(22) PCT Filed: Jul. 3, 2012

(86) PCT No.: PCT/JP2012/066981
§ 371 (c)(1),
(2), (4) Date: Jan. 30, 2013

(87) PCT Pub. No.: WO2013/042424
PCT Pub. Date: Mar. 28, 2013

(65) Prior Publication Data
US 2013/0186495 A1    Jul. 25, 2013

(30) Foreign Application Priority Data

Sep. 22, 2011    (JP) .................................. 2011-207891

(51) Int. Cl.
*F16L 37/32* (2006.01)
*F16L 37/28* (2006.01)
*F16L 37/34* (2006.01)

(52) U.S. Cl.
CPC ...... *F16L 37/28* (2013.01); *F16L 37/34* (2013.01)

(58) Field of Classification Search
CPC ................................. F16L 29/04; F16L 29/007
USPC .......... 137/614.01–614.05; 251/149.1, 149.6, 251/149.8
See application file for complete search history.

(56) References Cited

U.S. PATENT DOCUMENTS 2,850,298 A * 9/1958 Clark ........................ 137/614.03
3,334,659 A * 8/1967 Magorien .................. 251/149.6
(Continued)

FOREIGN PATENT DOCUMENTS

| EP | 0 329 672 | 12/1991 |
|---|---|---|
| JP | 57-87891 | 5/1982 |

(Continued)

OTHER PUBLICATIONS

Japanese Office Action (Notification of Reason for Refusal) issued Mar. 26, 2013 in corresponding Japanese Application No. 2011-207891, together with English translsation thereof.
(Continued)

*Primary Examiner* — Craig Schneider
*Assistant Examiner* — Craig J Price
(74) *Attorney, Agent, or Firm* — Wenderoth, Lind & Ponack, L.L.P.

(57) ABSTRACT

A fluid coupling includes a socket with a socket main body, a fixed valve, a guide which is engaged with the fixed valve and biased to be pressed against an inner surface of the socket main body, and a guide spring which biases the guide, and a plug with a plug main body, a movable valve, a valve spring, and a valve holder which supports the movable valve and the valve spring. When the plug is inserted into the socket, the guide moves rearward against a biasing force of the guide spring to connect a flow path between the plug and the socket. A fitted portion, which is fitted into the distal end of the plug, is disposed at the end portion of the guide. First seal members are disposed between the fitted portion and a distal end of the plug.

6 Claims, 10 Drawing Sheets

(56) References Cited

U.S. PATENT DOCUMENTS

| | | | |
|---|---|---|---|
| 3,380,476 A | 4/1968 | Torres | |
| 4,124,228 A * | 11/1978 | Morrison | 137/614.03 |
| 4,289,164 A * | 9/1981 | Ekman | 137/614.03 |
| 4,896,697 A * | 1/1990 | Stromdahl | 137/614.03 |
| 5,159,955 A * | 11/1992 | Ekman | 137/614.03 |
| 5,398,723 A * | 3/1995 | Allread et al. | 137/614.03 |
| 5,806,564 A * | 9/1998 | Wilcox | 137/614.05 |
| 5,996,624 A * | 12/1999 | Ekman | 137/614.03 |
| 6,116,277 A * | 9/2000 | Wilcox et al. | 137/614.02 |
| 6,158,717 A * | 12/2000 | Van Scyoc et al. | 137/614.02 |
| 6,382,251 B1 * | 5/2002 | Hopson | 137/614.05 |
| 6,681,803 B2 * | 1/2004 | Taneya et al. | 137/614.03 |
| 7,213,845 B2 * | 5/2007 | Sato et al. | 285/86 |
| 7,575,024 B2 * | 8/2009 | Zeiber et al. | 137/614.05 |
| 7,708,029 B2 * | 5/2010 | Kitagawa et al. | 137/614.03 |
| 7,762,279 B2 * | 7/2010 | Zeiber et al. | 137/614.05 |
| 8,641,013 B2 * | 2/2014 | Liu | 251/149.6 |
| 2007/0102051 A1 * | 5/2007 | Zeiber et al. | 137/614.05 |

FOREIGN PATENT DOCUMENTS

| | | |
|---|---|---|
| JP | 11-280976 | 10/1999 |
| JP | 2004-251446 | 9/2004 |
| JP | 2004-278620 | 10/2004 |
| JP | 2009-228898 | 10/2009 |
| KR | 10-2002-0068477 | 8/2002 |

OTHER PUBLICATIONS

European Search Report issued Jan. 20, 2015 in corresponding European Patent application No. 12818770.5.

* cited by examiner (A)

(B)

FLUID COUPLING

TECHNICAL FILED

The present invention relates to a fluid coupling which is configured by a plug and a socket.

BACKGROUND ART

FIG. 8 illustrates a state of a conventional fluid coupling whose plug 101 and socket 102 are separated from each other, FIGS. 9A and 9B illustrate a state in which the plug 101 and the socket 102 are connected with each other, and FIG. 10 illustrates a state in which the plug 101 is pulled away from the socket 102.

As illustrated in FIG. 8, a socket-side flow path is formed between an inner surface of the socket 102 and a fixed valve 103 which is fixed at an inside of the socket 102. A socket-side seal 105, which is disposed at a seal guide 104, is biased by a guide spring 106 so as to be pressed against the fixed valve 103, and the seal guide 104 is abutted against the inner surface of the socket 102 via a first seal ring 107, so that the socket-side flow path is closed. Steel balls 109, which are housed in holes 108 for locking the steel balls of the socket 102, are restricted to move inward by a guide ring 111 which is biased by a guide ring spring 110.

In the plug 101, a plug-side seal 116 is disposed at a distal end of a movable valve 115 which is disposed via a valve guide 114 so as to be movable in axial directions. This plug-side seal 116 is pressed against a valve seat 117 of the plug 101 by a valve spring 118 so that the plug-side flow path is closed.

When the plug 101 is inserted into the socket 102, first, the distal end of the plug 101 and the socket-side seal 105 are abutted with each other so as to seal the plug 101 and the socket 102 with each other. Then, when the distal end of the plug 101 is further pressed inward into the socket 102 while the movable valve 115 is being slid on the inner surface of the valve guide 114 and moved backward against the biasing force of the valve spring 118, the socket-side seal 105 moves in a direction of arrow A against the biasing force of the guide spring 106. With this, the press contact between the socket-side seal 105 and the fixed valve 103, and the press contact between the plug-side seal 116 and the valve seat 117 are released so that the socket-side flow path and the plug-side flow path are connected with each other. Simultaneously, a stepped portion 119, which is disposed at an outer circumferential surface of the plug 101, moves the guide ring 111 in the direction of arrow A so that the steel balls 109 are inserted into a locking groove 120 of the plug 101 so as to be locked. As mentioned above, the plug 101 and the socket 102 are locked with each other without requiring an operation of a sleeve 124 when the plug 101 is mounted, improving its operability. At this time, as illustrated in FIG. 9B, the seal guide 104 and the socket 102 are sealed by the first seal ring 107 of the socket 102 at a portion adjacent to an abutment portion between the socket-side seal 105 and the distal end of the plug 101. Moreover, the plug 101 and the socket 102 are sealed by a second seal ring 123.

In order to release a combined state between the plug 101 and the socket 102 illustrated in FIG. 9A, the sleeve 124 of the socket 102 is moved in the A direction so as to retract the steel balls 109 from the locking groove 120. Then, when the plug 101 is pulled in a direction opposite to the direction A, as illustrated in FIG. 10, the socket-side seal 105 is biased by the guide spring 106 and moves forward so as to be pressed against the fixed valve 103. With this, the socket-side flow path is closed. Moreover, when the plug 101 moves in the direction opposite to the direction A, the valve spring 118 biases the movable valve 115 so that the valve seat 117 and the plug-side seal 116 are pressed with each other so as to close the plug-side flow path. Then, the distal end of the plug 101 and the socket-side seal 105 are separated from each other so that the seal between the plug 101 and the socket 102 is released. In this fluid coupling, in order to minimize the remaining liquid at a connection space portion between the plug 101 and the socket 102 when the plug 101 is attached and detached, the distal end portions of the fixed valve 103 and the movable valve 115 are configured to be planar. The planar distal end portions are abutted with each other so as to minimize the space which is generated therebetween so that the remaining liquid, namely, the leakage of fluid, which is generated when the plug 101 is removed, is minimized.

However, in the above-mentioned conventional fluid coupling, as illustrated in FIG. 9B, the distance between the first seal ring 107 and the second seal ring 123 is long so that between the first seal ring 107 and the second seal ring 123 is generated a space S which is surrounded by the plug 101, the socket 102, the socket-side seal 105, and the seal guide 104. Moreover, the seal between the plug 101 and the socket 102 is established only by bringing the distal end of the plug 101 and the socket-side seal 105 into abutment. Therefore, when the plug 101 is inclined, the abutment between the plug 101 and the socket-side seal 105 is loosened so that leaked liquid accumulates in the space S. Accordingly, when the plug 101 is separated from the socket 102, the liquid, which has accumulated in the space S, leaks outside. Moreover, it is not assured that the flow paths of the plug 101 and the socket 102 are opened while ensuring the seal between the plug 101 and the socket 102. Accordingly, in some cases, the generation of remaining liquid cannot be avoided.

Furthermore, since the seal guide 104 and the guide ring 111 are disposed separately, the guide spring 106 and the guide ring spring 110 need to be disposed also separately. Accordingly, the number of parts increases, and its assembling requires a lot of time.

Then, there is proposed in Patent Document 1 a configuration which more surely ensures the seal between the plug and the socket. That is, in this fluid coupling, when the plug is inserted into the socket, the plug is inserted into a collar so as to press a movable valve body. Because the plug and the collar are fitted into each other, the seal between the plug and the socket is more surely established so as to prevent the liquid leakage.

PRIOR ART DOCUMENT

Patent Document

Patent Document 1: Japanese Patent Application Laid-Open No. 2009-228898

However, in the fluid coupling described in Patent Document 1, the collar and the guide portion which guides the plug to the collar are disposed separately from the movable valve body, and therefore there is a problem that its configuration is made complicated and its manufacturing cost increases.

SUMMARY OF THE INVENTION

The present invention has been made taking the above-mentioned conventional problems into account, and an object thereof is to provide a fluid coupling which can surely prevent the liquid leakage, and decrease the manufacturing cost and the manufacturing time.

In order to solve the above-mentioned problems, a fluid coupling according to the present invention includes:

a socket including a socket main body which has an insertion hole, a fixed valve which is fixed at an inside of the socket main body, a guide which is engaged with the fixed valve, and is biased so as to be pressed against an inner surface of the socket main body, and a spring which biases the guide; and a plug including a plug main body which has an insertion hole, a movable valve which is biased so as to be engaged with a valve seat formed at an inner surface of the plug main body, a spring which biases the movable valve, and a valve holder which supports the movable valve and the spring in an inside of the plug main body, wherein, when the plug is inserted into the socket, the plug main body and the guide of the socket are abutted with each other so that the guide moves backward against a biasing force of the spring so as to connect a flow path between the plug and the socket, and wherein a fitted portion, which is fitted into a distal end of the plug, is disposed at an end portion of the guide, and a first seal member is disposed between the fitted portion and the distal end of the plug.

According to the above-mentioned configuration, when the plug is inserted into the socket, first, the distal end of the plug main body and the fitted portion of the guide are fitted with each other and sealed by the first seal member so that the plug and the socket are sealed with each other. Moreover, when the plug is pressed inward in the socket, the engagement between the plug main body and the movable valve, and the engagement between the fixed valve and the guide are released so that the respective flow paths of the plug and the socket are opened. Therefore, fluid can be prevented from leaking outside.

Moreover, when the plug, which is under a state of being inserted into the socket, is pulled out of the socket, first, the movable valve is engaged with the valve seat of the plug main body, and also the guide is engaged with the fixed valve, so that the respective flow paths of the plug and the socket are closed. Accordingly, the fitted and sealed state of the distal end of the plug main body and the fitted portion of the guide is released so as to release the seal between the plug and the socket. With this, similarly to the situation where the plug is inserted into the socket, fluid can be prevented from leaking outside.

Under a state in which the plug is released from the socket, the guide is engaged with the fixed valve and the inner surface of the socket main body so as to close the flow paths in the socket. Under a state in which the plug is inserted into the socket, the fitted portion of the guide and the distal end of the plug main body are fitted with each other so as to be sealed. As mentioned above, by using a member of the guide, the flow paths in the socket are closed, and the socket and the plug are sealed with each other, so that the positional relationship of the seal can be ensured, and a reliable and certain seal can be established. Moreover, the configuration can be simplified so that the manufacturing cost and the manufacturing time can be reduced.

Preferably, the inner surface of the fitted portion is made to be larger in diameter than the inner surface of the guide, and is continuous with the inner surface of the guide via a stepped portion which is engaged with the distal end of the plug, and the first seal member is disposed between the inner surface of the fitted portion and the outer circumferential surface of the distal end of the plug.

When the plug is inserted into the socket, the distal end of the plug is engaged with the stepped portion, and the first seal member seals the inner surface of the fitted portion and the outer circumferential surface of the plug distal end. Therefore, the space, where fluid generated between the guide and the plug stays, is reduced. Therefore, when the plug is released from the socket, the leaking amount of the fluid staying in the space can be reduced.

Preferably, as a concrete means, the first seal member is configured by two O-rings which are disposed side by side in the axial direction.

The two O-rings are disposed at the inner surface of the fitted portion so that, when the distal end of the plug is inserted into the fitted portion, the O-ring at the front side removes dust and the like adhered to the distal end of the plug, and the O-ring at the back side seals the distal end of the plug and the guide. Accordingly, the reliability of the seal can be ensured.

Moreover, the plug is biased by the elasticity of the two O-rings along the circles which are concentric with the axis so that the plug is prevented from being displaced, and even when the plug is inclined, either of the two O-rings can provide the seal so that the reliability of the seal can be ensured.

As another means, the first seal member may be configured by two O-rings which are disposed side by side at the outer circumferential surface of the distal end of the plug.

The two O-rings are disposed at the distal end of the plug so that, even when the plug is left in a state of being connected with a hose or the like, the elastic O-ring functions as a protective member so that the distal end of the plug can be prevented from being damaged due to contact with other members.

Preferably, a second seal member is disposed between the inner surface of the guide and the fixed valve.

With this, the first seal member and the second seal member are disposed close to each other so that the space, where the fluid generated between the guide and the plug stays, is reduced.

Preferably, a third seal member is disposed between the outer circumference of the guide and the inner surface of the socket main body.

With this, under a state in which the plug is released from the socket, the second seal member seals the guide and the fixed valve with each other, and the third seal member seals the guide and the inner surface of the socket main body with each other. Then, when the plug is inserted into the socket, the first seal member seals the fitted portion of the guide and the distal end of the plug main body, and after that, the seal by the second seal member between the guide and the fixed valve is released. Moreover, when the plug is pulled out for releasing the connection between the socket and the plug, the second seal member seals the guide and the fixed valve with each other, and the third seal member seals the guide and the inner surface of the socket main body with each other, and after that, the seal by the first seal member between the fitted portion of the guide and the distal end of the plug main body is released.

Therefore, in any of the attached and detached states of the socket and the plug, it is ensured that the valve can be operated only in a state where the seal between the socket and the plug is secured, so that prevention of leakage of inner fluid can be ensured under any of the operating states.

Preferably, the spring is disposed at the outer circumference of the guide.

With this, a contact between the spring and the fluid flowing in the socket can be eliminated so that the fluid resistance generated at the unevenness on the spring surface can be reduced.

Effect of the Invention

According to the present invention, by using one member of the guide, the flow paths in the socket are closed, and the socket and the plug main body are sealed with each other, so that the positional relationship of the seal can be ensured, and a reliable and certain seal can be established. Furthermore, the manufacturing cost can be reduced.

DETAILED DESCRIPTION

An embodiment of the present invention is described with reference to the attached drawings hereunder.

Figure 1:
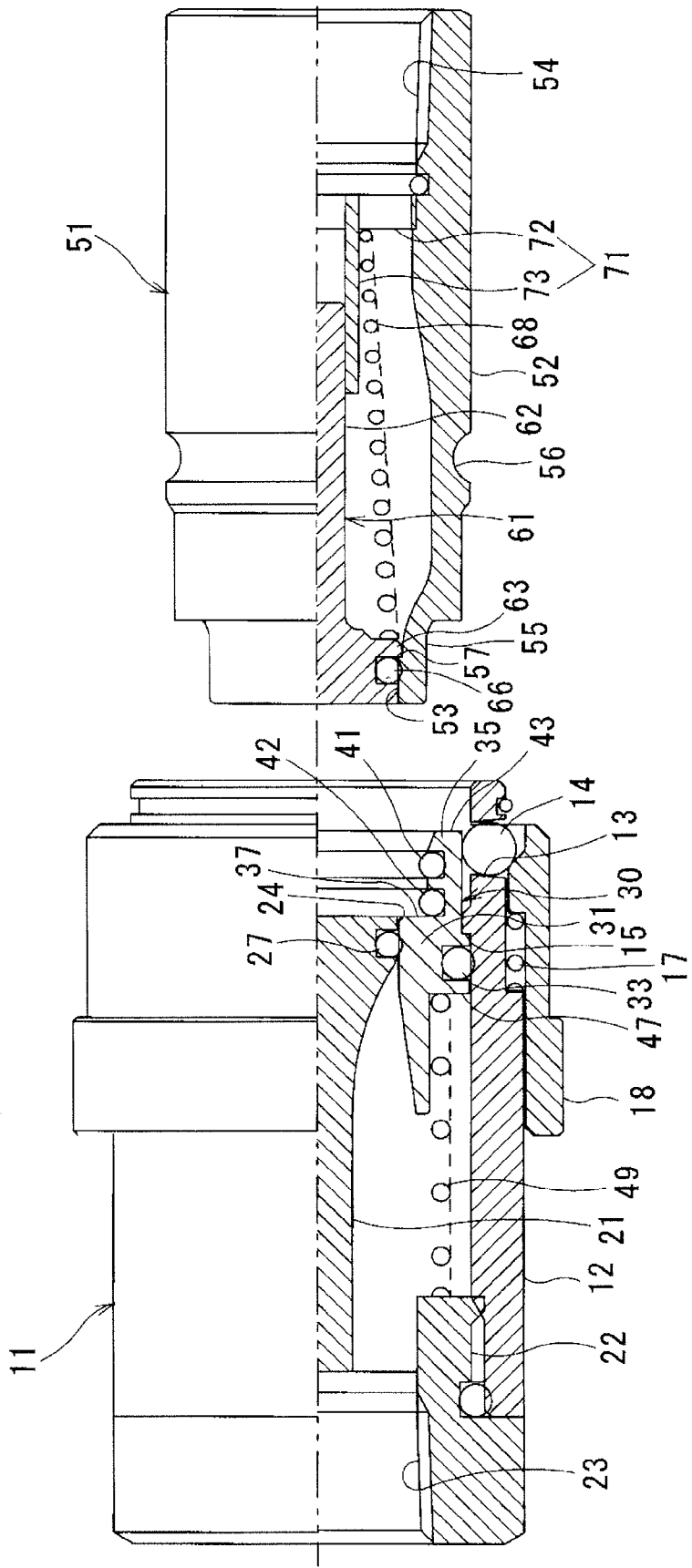
FIG. 1 is a cross-sectional view of a fluid coupling under a state of being separated (non-insertion state) according to an embodiment of the present invention.

As illustrated in FIG. 1, a fluid coupling 1 is configured by a socket 11 and a plug 51 which are liquid-tightly connected with each other.

The socket 11 includes a socket main body 12 having an insertion hole, a fixed valve 21 which is fixed at an inside of the socket main body 12, a guide 30 which is disposed between the fixed valve 21 and the socket main body 12, and a guide spring 49 which biases the guide 30. The guide 30 is engaged with the outer circumference of the fixed valve 21 and the inner circumference of the socket main body 12 so that a flow path formed between the fixed valve 21 and the socket main body 12 is closed.

Figure 2:
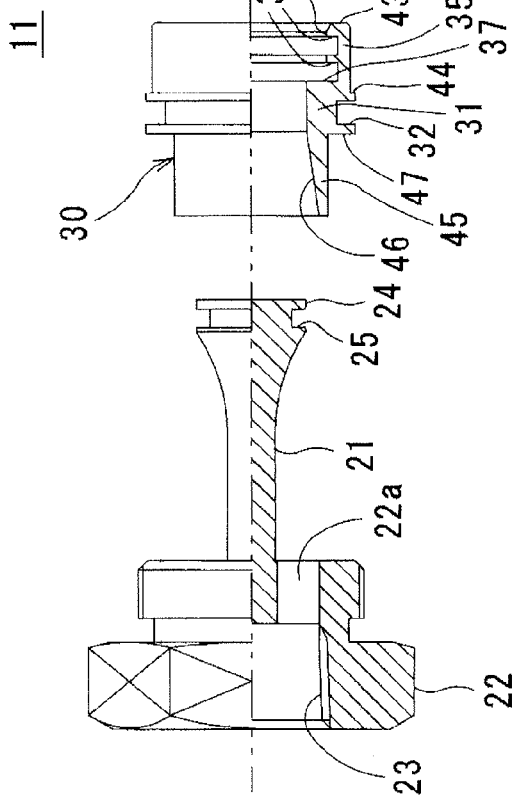
FIG. 2A is an exploded cross-sectional view of the socket of FIG. 1.
FIG. 2B is an exploded cross-sectional view of the plug of FIG. 1.
FIG. 2C is a front view of a valve holder of FIG. 2B.
Figure 2:
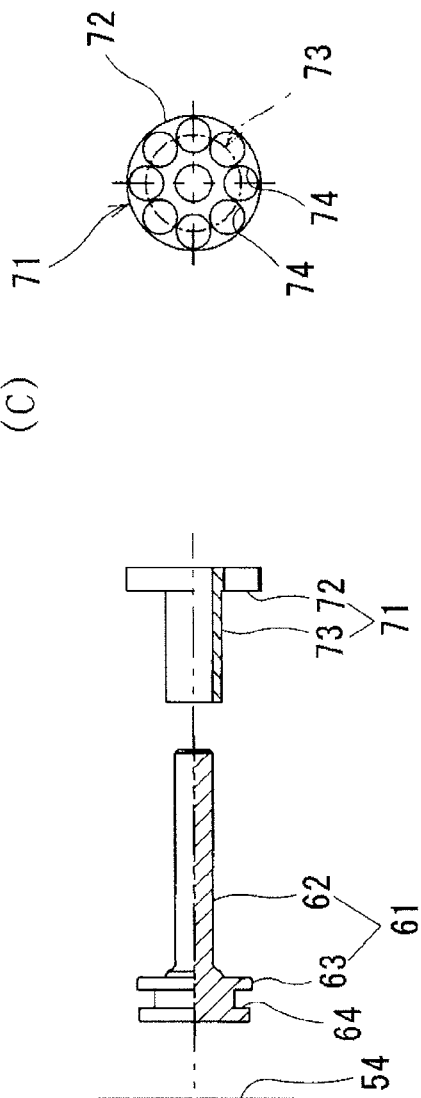
Figure 2:
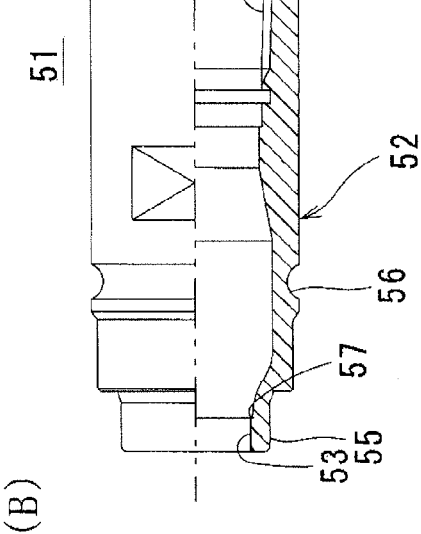

As illustrated in FIG. 2A, the socket main body 12 has a cylindrical shape. A stopper 15 is disposed on the inner surface of the socket main body 12 so as to protrude therefrom. A plurality of holes 13 for locking the steel balls are formed at the right-side end portion of the sheet of FIG. 2A of the socket main body 12. Steel balls 14 are housed in the holes 13 for locking the steel balls. Moreover, a sleeve 18 is fitted around the outer circumference of the socket main body 12 via a sleeve spring 17 for sleeve.

The fixed valve 21 is integrally disposed via a stay 22a at an inside of a base 22 having a substantially cylindrical shape which is attached via a thread connection at the inner surface of the left-side end portion of the socket main body 12. Female threads 23 are formed on the inner surface of the base 22, and one pipe is connected thereto via a thread connection. The fixed valve 21 extends from the base 22 toward the right side in the sheet of FIG. 2A, and an end portion thereof is enlarged in its diameter so as to form a fixed valve-side head portion 24. An outer circumferential groove 25 at the fixed valve side is disposed on the outer circumference of the fixed valve-side head portion 24, and a second O-ring (second seal member) 27 is mounted on the fixed valve-side outer circumferential groove 25.

The guide 30 is configured by a guide main body 31 having a substantially annular shape which extends in the axial direction, a fitted portion 35 which is formed at one end portion of this guide main body 31, and a rear end portion 45 which is formed at the other end portion thereof. Under a state in which the socket 11 is assembled, a first sealing surface on the inner surface of the guide main body 31 is engaged with the outer circumferential surface of the fixed valve-side head portion 24 via the second O-ring 27.

A guide-side outer circumferential groove 32 is disposed on the outer circumference of the guide main body 31, and a third O-ring (third seal member) 33 is mounted in this guide-side outer circumferential groove 32.

The fitted portion 35 is formed at the right-side end portion in the sheet of FIG. 2A of the guide main body 31. The inner surface 36 of the fitted portion 35 is continuous with the inner surface of the guide main body 31 via a stepped portion 37, and is enlarged in diameter with respect to the inner surface of the guide main body 31. Two inner circumferential grooves 38 and 38 are disposed side by side in the axial direction on the inner surface 36, and first O-rings 41 and 42 as first seal members are mounted in these inner circumferential grooves 38 and 38. The outer circumferential surface of the fitted portion 35 is reduced in diameter with respect to the outer circumferential surface of the guide main body 31, and is continuous with the same via a stepped portion 44. The end surface of the fitted portion 35 forms an opposite surface 43 which is opposite to the plug 51.

The rear end portion 45 is formed at the left-side end portion in the sheet of FIG. 2A of the guide main body 31. The inner surface of the rear end portion 45 forms an inclined surface 46 which is inclined so as to be enlarged in diameter with respect to the inner surface of the guide main body 31. The outer circumferential surface of the rear end portion 45 is reduced in diameter with respect to the outer circumferential surface of the guide main body 31, and is continuous with the outer circumferential surface of the guide main body 31 via a stepped portion 47.

As illustrated in FIG. 1, the guide spring 49 is configured by a coil spring. The guide spring 49 is disposed between the base 22 of the fixed valve 21 and the stepped portion 47 of the guide 30 under a state of being compressed such that the stepped portion 44 of the guide main body 31 is biased so as to be pressed against the stopper 15 of the socket main body 12. As shown in FIG. 1, the guide spring 49 is exposed in the flow path before the plug 51 is inserted in the socket 11.

The plug 51 includes a plug main body 52 having an insertion hole, a movable valve 61 which is biased so as to slide on a valve seat 53 formed on the inner surface of the plug main body 52, a valve spring 68 which biases the movable valve 61, and a valve holder 71 which supports the movable valve 61 and the valve spring 68 in the inside of the plug main body 52. The movable valve 61 slides on the valve seat 53 so that the flow path formed between the movable valve 61 and the plug main body 52 is closed.

As illustrated in FIG. 2B, the plug main body 52 has a cylindrical shape, and a distal end 55 of the left-side end portion in the sheet of FIG. 2B has an outer shape which is fitted with the inner surface 36 of the fitted portion 35 of the guide 30 of the socket 11. On the inner surface of the distal end 55 are formed a valve seat 53 and a stopper 57 which is enlarged in diameter with respect to the valve seat 53. A plug-side outer circumferential groove 56 is formed at a portion of the outer circumferential surface which is located on the right side in the sheet of FIG. 2B with respect to the distal end 55. Female threads 54 are formed on the inner surface of the right-side end portion in the sheet of FIG. 2B of the plug main body 52, and the other pipe is connected with the same via a thread connection.

Figure 3:
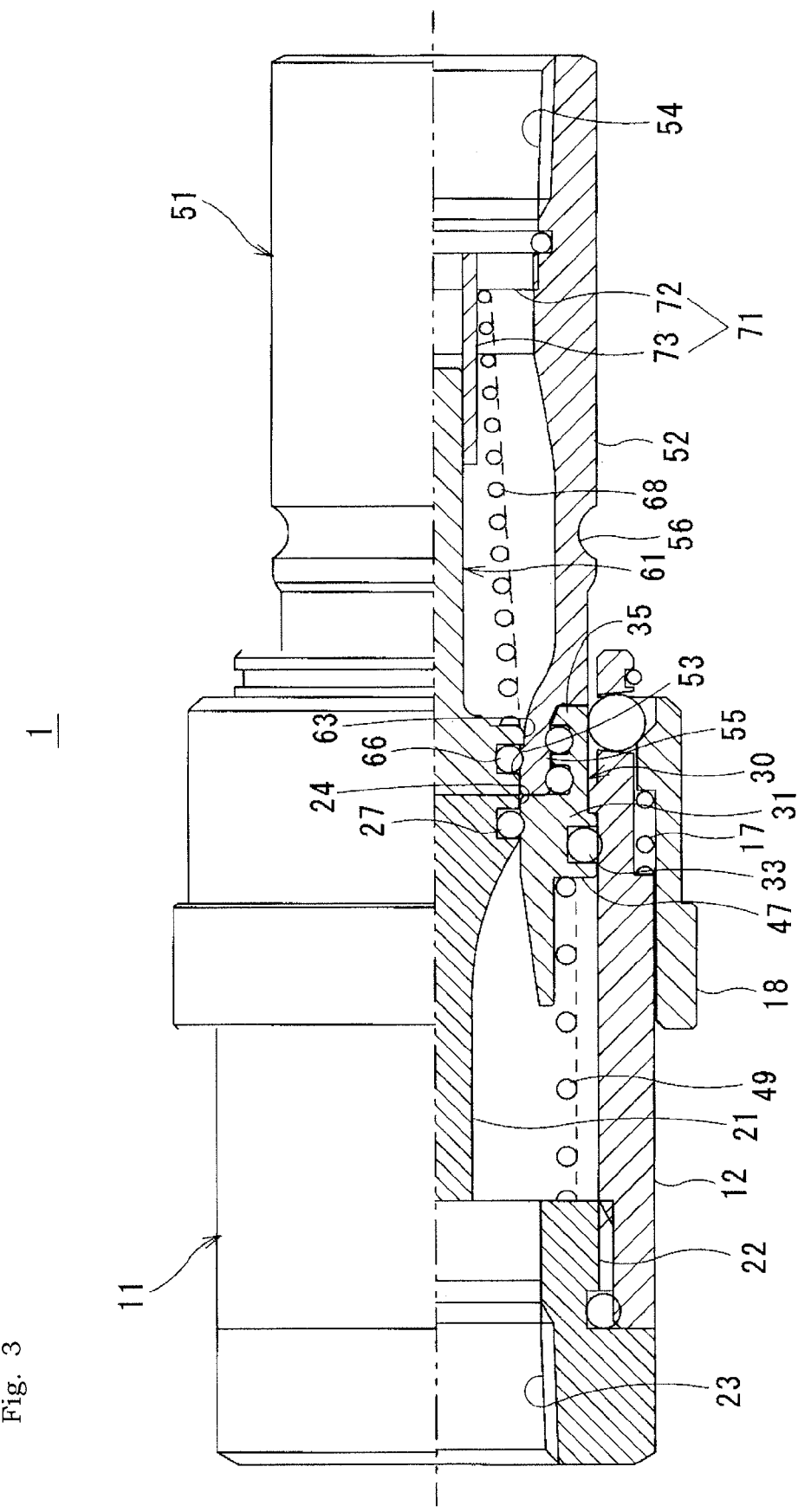
FIG. 3 is a cross-sectional view of an insertion state in which the plug is abutted against the socket of FIG. 1.
Figure 4:
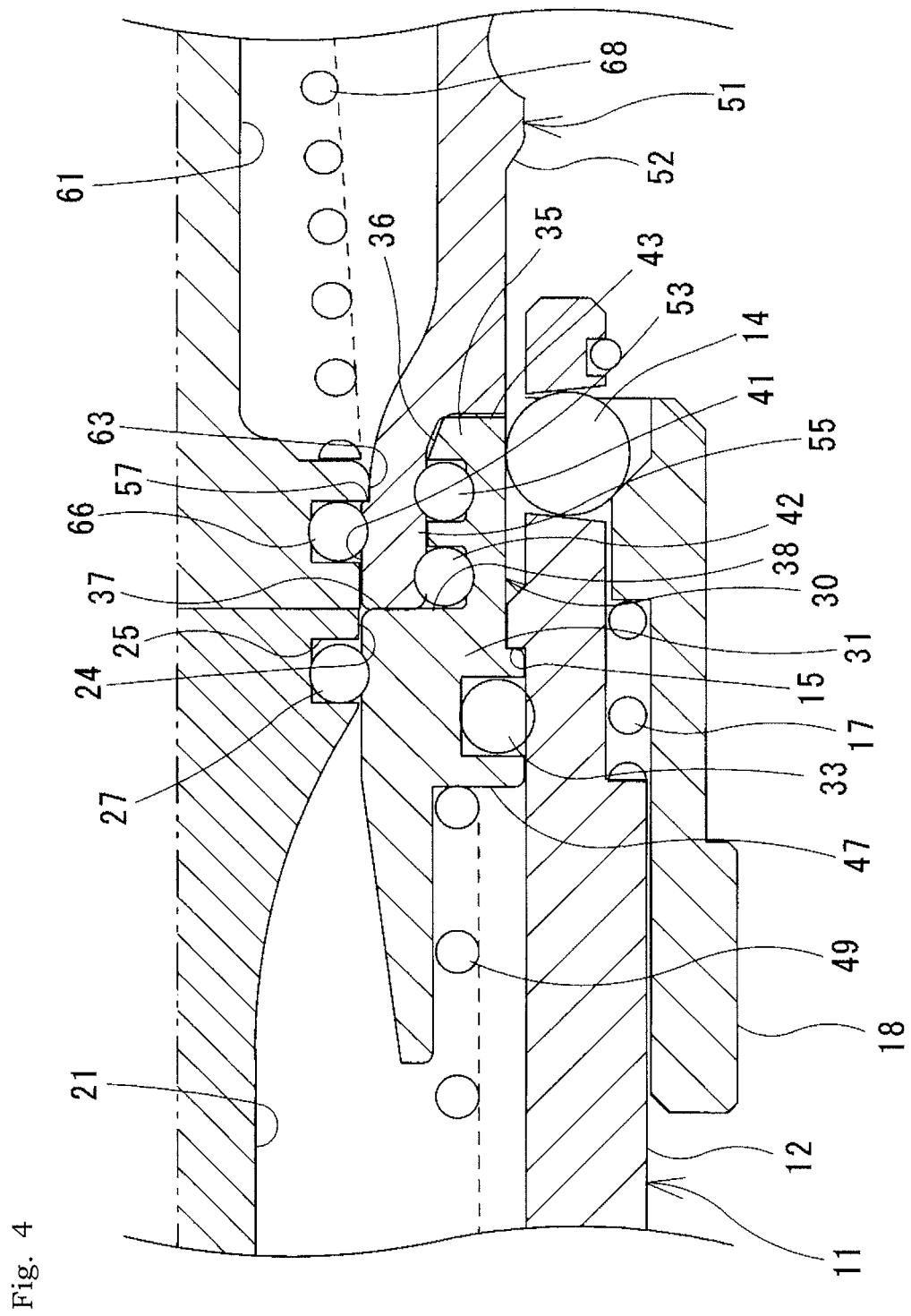
FIG. 4 is an enlarged cross-sectional view of a guide of FIG. 3 and its circumference.

The movable valve 61 is configured by a columnar portion 62 of small diameter which slides on the inner surface of the valve holder 71 so as to be supported thereon, and a movable valve-side head portion 63 of large diameter which is formed at the end portion of the columnar portion 62. A movable valve-side outer circumferential groove 64 is disposed on the outer circumference of the movable valve-side head portion 63, and a fourth O-ring 66 is mounted in this movable valve-side outer circumferential groove 64. Under a state in which the plug 51 is assembled, the outer circumferential surface of the movable valve-side head portion 63 is engaged with the valve seat (second sealing surface) 53 via the fourth O-ring 66, the corner portion of the movable valve-side head portion 63, which is located at the rear end side of the movable valve-side outer circumferential groove 64, is pressed against the stopper 57 of the plug main body 52. As shown in FIGS. 3 and 4, the inner surface (first sealing surface) of the guide main body 31 is flush with and forms a substantially cylindrical surface with the valve seat (second sealing surface) 53 of the distal end 55 of the plug main body 52, and such substantially cylindrical surface crosses a plane formed by the first abutment surface (formed by the abutment of the end faces of the fixed valve 21 and movable valve 61) and the second abutment surface (formed by the abutment of the distal end 55 and the stepped portion 37).

As illustrated in FIG. 1, the valve spring 68 is configured by a conical coil spring. The valve spring 68 is disposed between the valve holder 71 and the movable valve-side head portion 63 under a state of being compressed such that the rear end-side corner portion of the movable valve-side head portion 63 is biased so as to be pressed against the stopper 57.

The valve holder 71 is configured by a locking portion 72 having an annular shape which is locked against the inner circumference of the plug main body 52, and an insertion portion 73 which extends from the locking portion 72 in the axial direction. As illustrated in FIG. 2C, a plurality of circular holes 74 are formed in the locking portion 72 so that fluid can pass through the same. The columnar portion 62 of the movable valve 61 is inserted into the insertion portion 73 so as to be supported.

When the socket 11 and the plug 51 having the above-mentioned configurations are to be connected with each other, first, in the insertion state as illustrated in FIG. 3, the distal end 55 of the plug 51 is fitted into the fitted portion 35 of the guide 30. At this time, as illustrated in FIG. 4, the two first O-rings 41 and 42 are disposed at the inner surface 36 of the fitted portion 35 so that, when the distal end 55 is inserted into the fitted portion 35, the first O-ring 41 at the front side removes dust and the like adhered to the distal end 55. Then, the first O-ring 42 at the back side seals the distal end 55 and the guide 30 so that the reliability of the seal can be ensured. Moreover, when the distal end 55 is inserted, the stepped portion 37 is abutted against the distal end 55. When the distal end 55 of the plug 51 and the fitted portion 35 of the guide 30 are fitted with each other, the plug 51 and the socket 11 are sealed with each other by the two first O-rings 41 and 42, and the end surface of the fixed valve-side head portion 24 and the end surface of the movable valve-side head portion 63 are abutted with each other. At this time, the distal end 55 is biased by the elasticity of the two first O-rings 41 and 42 along the circles which are concentric with the axis so that the plug 51 is prevented from being displaced. Moreover, even when the plug is inclined, either of the two O-rings can provide the seal so that the reliability of the seal can be ensured.

Then, when the plug main body 52 is pressed inward into the socket 11 while the movable valve 61 is being slid on the inner surface of the valve holder 71 against the biasing force of the valve spring 68, the guide 30 moves backward against the biasing force of the guide spring 49. With this, the guide 30 is released from the fixed valve-side head portion 24, and the engagement between the guide 30 and the fixed valve 21 is released, so that the flow path in the socket 11 is opened. Similarly, the movable valve-side head portion 63 is released from the valve seat 53, and the engagement between the movable valve 61 and the valve seat 53 is released, so that the flow path in the plug 51 is opened so as to make the fluid movable.

Figure 6:
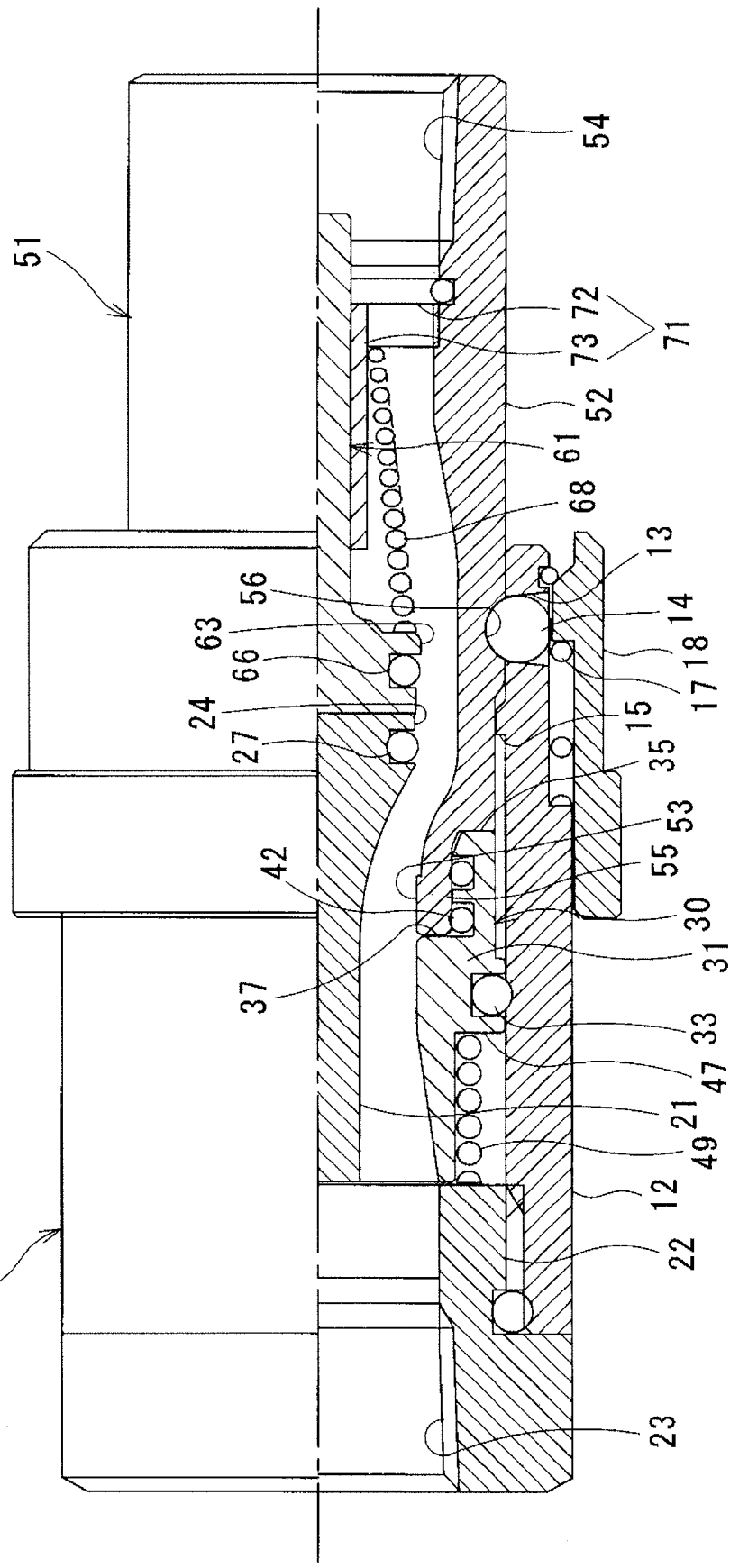
FIG. 6 is a cross-sectional view of the fluid coupling of FIG. 1 under a state of being connected.

Accordingly, when the plug 51 is inserted into the socket 11, the plug 51 and the socket 11 are sealed with each other by the two first O-rings 41 and 42, and after that, the flow path of the socket 11 and the flow path of the plug 51 are respectively opened so that the fluid is prevented from leaking outside. In a connected state in which the plug 51 is inserted in the socket 11, as shown in FIG. 6, the rear end of the guide 30 comes into contact with the base 22 provided in the socket main body 12 so that the exposure of the guide spring 49 in the flow path is blocked and the inner circumferential surface of the rear end of the guide 30 is flush with and continues with the inner circumferential surface of the base 22. From the insertion state of FIG. 3 to the connected state of FIG. 6, the guide 30 and the distal end 55 of the plug main body 52 are axially moved relative to the socket main body 12 further rearward into the socket main body 12, and the fixed valve 21 and the movable valve 61 are axially moved relative to the plug main body 52 further rearward into the plug main body 52, such that the first and second abutment surfaces are axially separated away from each other.

Subsequently, when the plug main body 52 is pressed into, as illustrated in FIG. 6, the steel ball 14 is pressed against the inner surface of the sleeve 18 which is biased by the sleeve spring 17 for sleeve so as to be moved to the right side in the sheet of FIG. 6, so that the steel ball 14 protrudes inward from the hole 13 for locking the steel ball so as to be engaged with the plug-side outer circumferential groove 56 and locked. Under a state in which the plug 51 and the socket 11 are connected with each other, and the fluid flows therein, the fluid enters the space from the gap between the stepped portion 37 and the distal end 55 to the first O-ring 42.

When the connection between the plug 51 and the socket 11 is to be released, the sleeve 18 is moved in the left direction in the sheet of FIG. 6 and that the plug 51 is pulled in the direction for separating the plug 51. Then, the steel ball 14 moves in the hole 13 for locking the steel ball to the sleeve 18 side, and the lock is released so that the plug 51 can be pulled out. When the plug 51 is pulled out of the socket 11, first, the movable valve-side head portion 63 is biased by the valve spring 68 so as to slide on the valve seat 53, and be abutted against the stopper 57. On the other hand, the guide 30 is biased by the guide spring 49 so as to slide on the fixed valve-side head portion 24, and the stepped portion 44 is abutted against the stopper 15, so that the flow path of the plug 51 and the flow path of the socket 11 are respectively closed. Then, the fitted and sealed state of the distal end 55 of the plug main body 52 and the fitted portion 35 of the guide 30 is released so that the seal between the plug 51 and the socket 11 is released. With this, similarly to the situation in which the plug 51 is inserted into the socket 11, the fluid is prevented from leaking outside.

Figure 5:
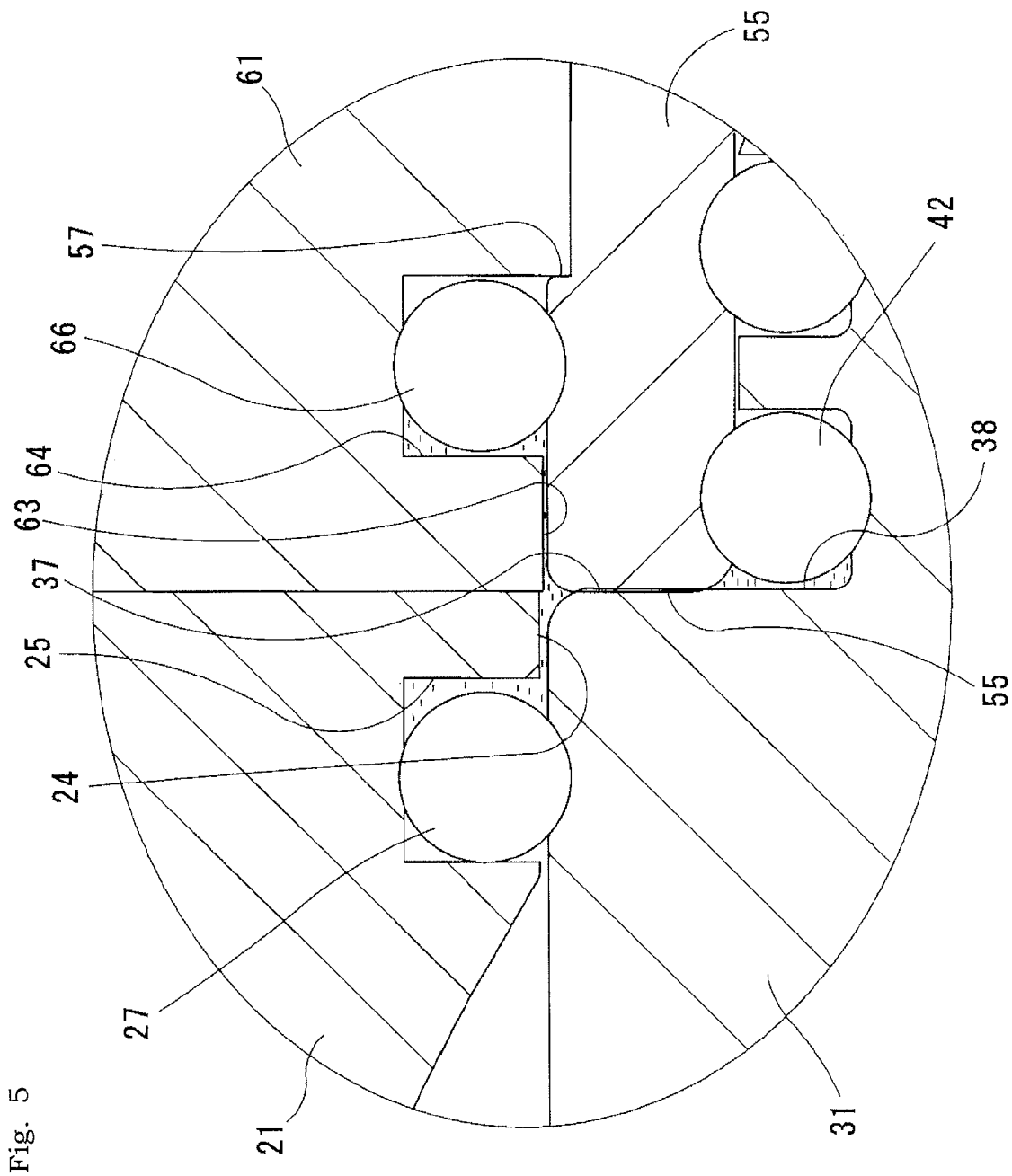
FIG. 5 is a further enlarged cross-sectional view of the guide and its circumference of FIG. 4.

When the plug 51 is detached from the socket 11, as illustrated in FIG. 5, there stays fluid in the space surrounded by the gap among the second O-ring 27, the fourth O-ring 66, and the first O-ring 42, namely, the gap between the fixed valve-side outer circumferential groove 25 and the second O-ring 27, the gap between the fixed valve-side head portion 24 and the inner surface of the guide main body 31, the gap between the stepped portion 37 and the distal end portion 55, the gap between the inner circumferential groove 38 and the first O-ring 42, the gap between the movable valve-side outer circumferential groove 64 and the fourth O-ring 66, the gap between the inner surface of the distal end 55 and the movable valve-side head portion 63, and the gap of the abutment surfaces between the fixed valve 21 and the movable valve 61. In the present invention, since the second O-ring 27 and the first O-ring 42 are disposed close to each other so as to reduce the above-mentioned space, when the plug 51 is released from the socket 11, the leakage of fluid staying in the above-mentioned space can be reduced. As shown in FIGS. 3 and 6, the movable valve 61 and fixed valve 21 have end faces that face one another and are in abutment in the insertion and connected states. As shown in FIGS. 2A and 2B, the end faces of the movable valve 61 and fixed valve 21 are planar over an entire diameter thereof.

Under a state in which the plug 51 is detached from the socket 11, the guide 30 is engaged with the fixed valve 21 via the second O-ring 27, and is engaged with the inner surface of the socket 11 via the third O-ring 33, so as to close the flow path in the socket 11. Accordingly, by using one member of the guide 30, the flow path in the socket 11 is closed, and the socket 11 and the plug main body 52 are sealed with each other, so that the positional relationship of the seal can be ensured, and a reliable and certain seal can be established. Moreover, the configuration can be simplified so that the manufacturing cost and the manufacturing time can be reduced.

The present invention is not limited to the above-mentioned embodiment, and various modifications can be made.

Figure 7:
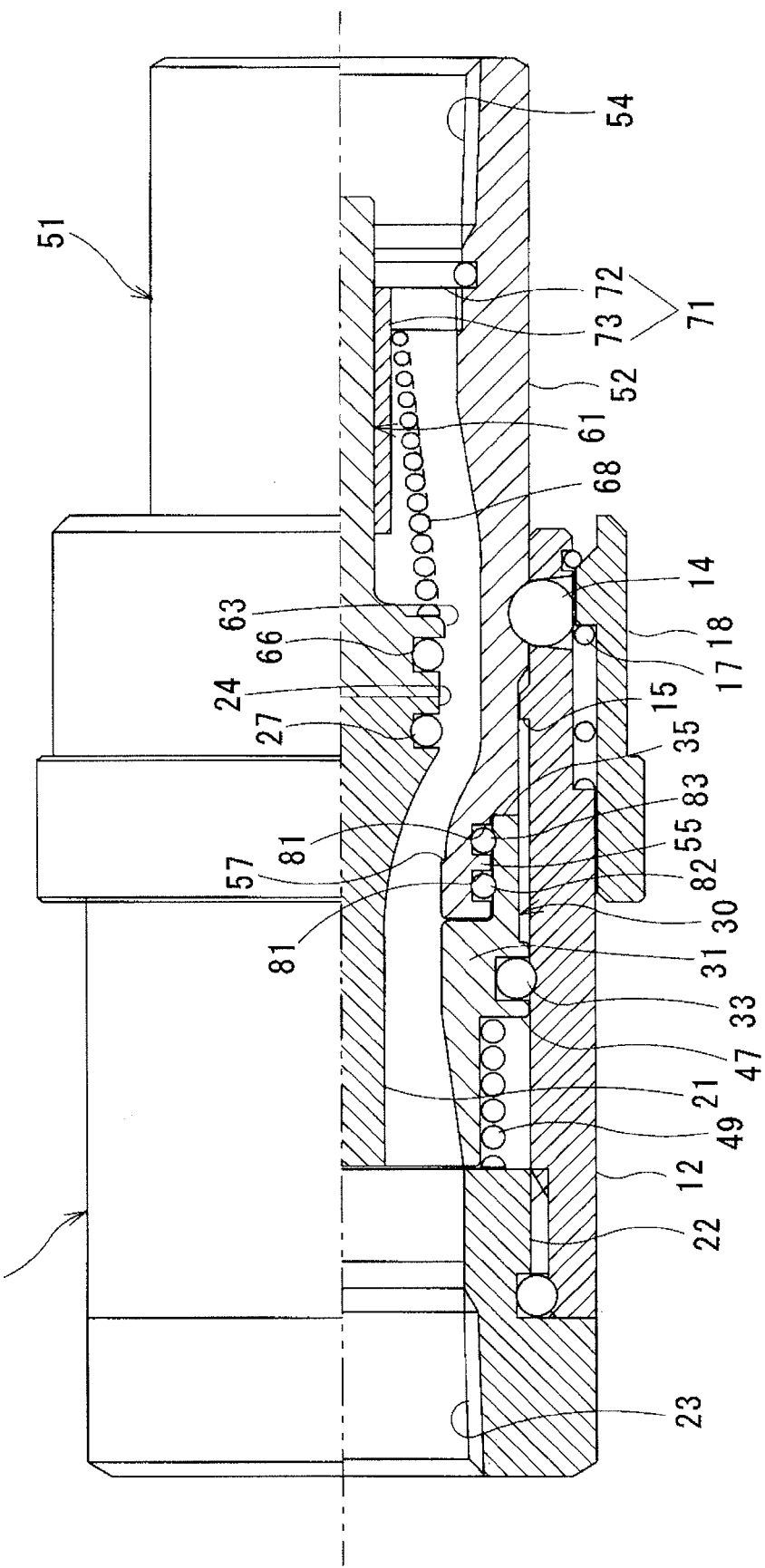
FIG. 7 is a cross-sectional view of a fluid coupling according to a modified example under a state of being connected.
Figure 8:
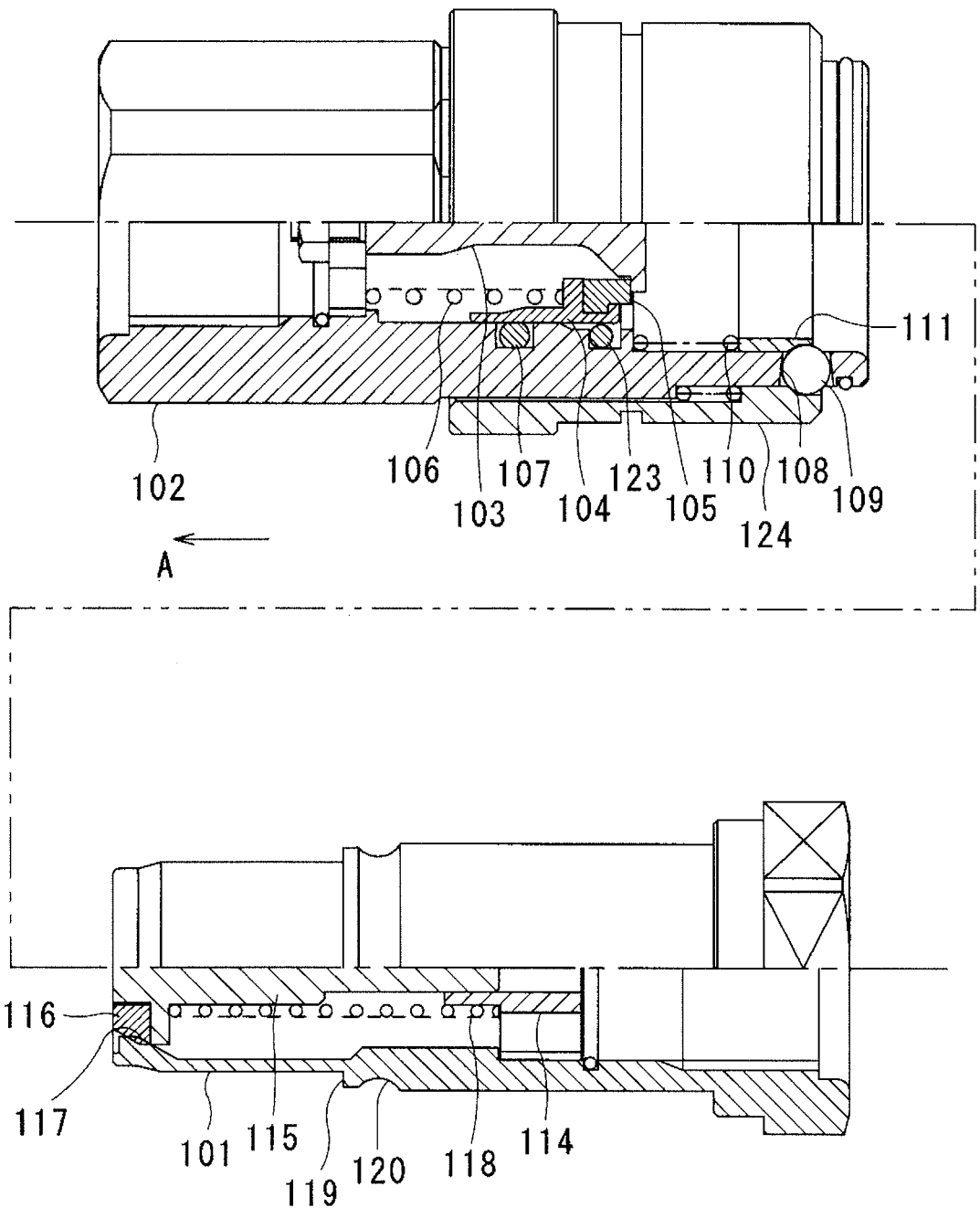
FIG. 8 is a cross-sectional view of a conventional fluid coupling under a state of being separated.
Figure 9:
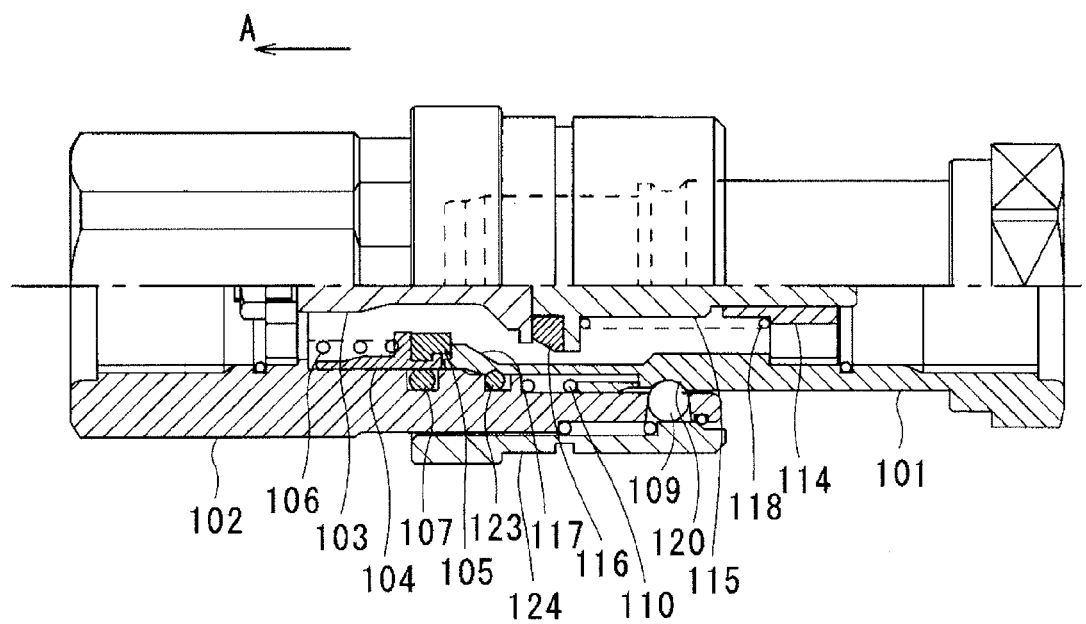
FIG. 9A is a cross-sectional view of the fluid coupling of FIG. 7 under a state of being connected.
FIG. 9B is a partial enlarged cross-sectional view of a plug distal end and a socket-side seal portion of FIG. 9A.
Figure 9:
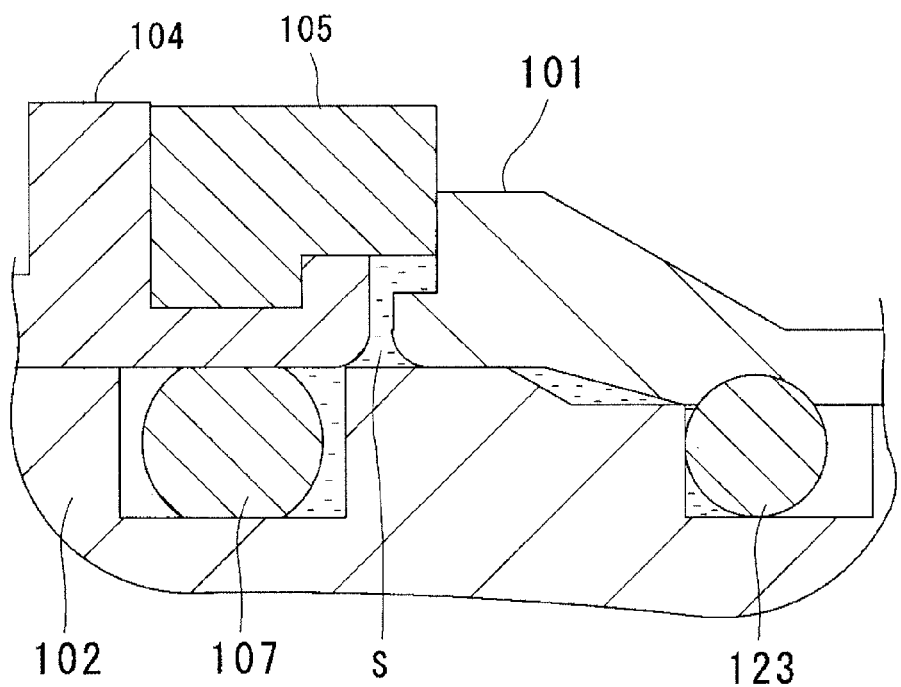
Figure 10:
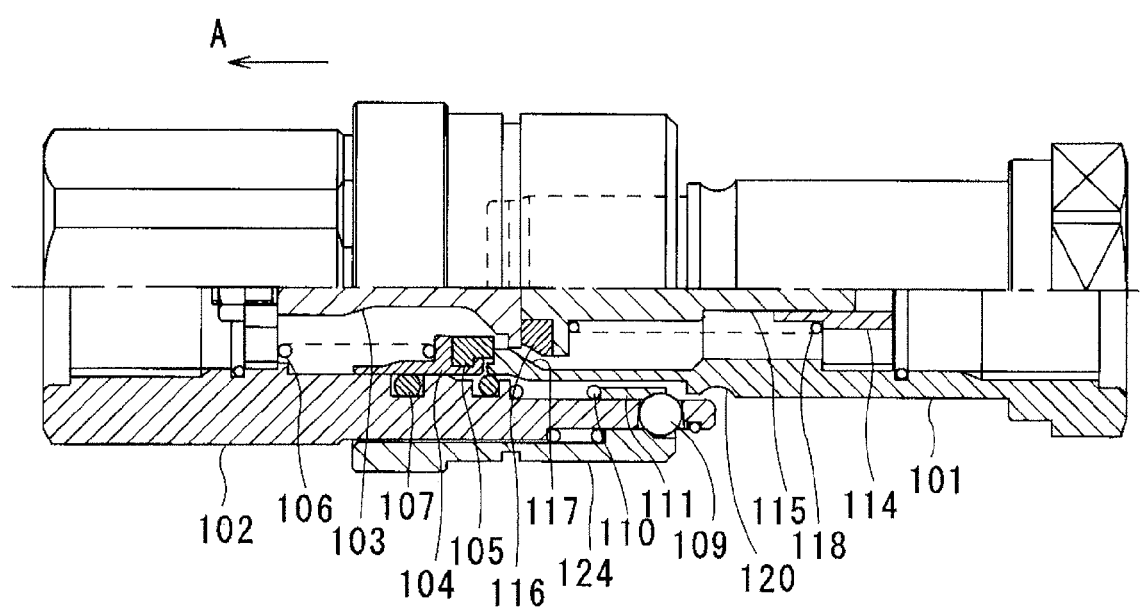
FIG. 10 is a cross-sectional view of a state in which the plug and the socket under the state of FIG. 9 are being separated from each other.

Regarding the guide 30, its shape is not specifically limited as long as the guide 30 is fitted with the distal end 55 of the plug 51, and seals the socket 11 and the plug 51 with each other. For example, as illustrated in FIG. 7, two outer circumferential grooves 81 and 81 may be disposed side by side in the axial direction on the outer circumference of the distal end 55 of the plug 51, and two O-rings 82 and 83 may be mounted on the outer circumferential groove 81. In the arrangement shown in FIG. 7, the plug main body has an enlarged circumferential portion which is located rearwardly of the distal end of the plug and which has a larger circumference than the distal end of the plug, and the O-rings 82 and 83 are mounted on the plug main body in a position such that they are disposed radially inwardly of a straight line connecting an outer circumferential corner portion of the distal end of the plug with an outer circumferential corner portion of the enlarged circumferential portion of the plug main body. With this, even when the plug 51 is left in a state of being connected with a hose or the like, the elastic O-rings 82 and 83 can be prevented from being damaged due to contact with other members.

The invention claimed is:
1. A fluid coupling, comprising:
a socket including a socket main body which has a socket front end and an insertion hole opening through the socket front end, a fixed valve which is fixed to the socket main body at an inside of the socket main body, a guide which is axially movably mounted in the socket main body, and a guide spring which biases the guide toward the socket front end to be pressed against an inner surface of the socket main body, the guide including a guide main body, a fitted portion at a front end of the guide main body, and a stepped portion joining the fitted portion with the guide main body; and
a plug including a plug main body, which has a plug front end configured to face the socket front end and be inserted into the insertion hole of the socket main body, and an insertion hole opening through the plug front end, a movable valve axially movably mounted in the plug main body, a valve spring which biases the movable valve toward the plug front end, and a valve holder which supports the valve spring in an inside of the plug main body and which movably supports the movable valve in the inside of the plug main body, the plug having a distal end at the plug front end of the plug main body;
wherein the movable valve of the plug has a first end face, the fixed valve of the socket has a second end face which faces the first end face, and each of the first and second end faces is planar over an entire diameter of the first and second end faces;
wherein the socket and the plug are configured to be moved between a non-insertion state in which the plug is not inserted in the socket, an insertion state in which the plug is inserted into the socket such that the first and second end faces abut against each other, and a connected state in which a fluid flow path is established between the socket and the plug;
wherein, with the plug and the socket in the insertion state, the plug main body and the guide of the socket are abutted with each other so that, upon further insertion of the plug into the socket toward the connected state, the guide moves rearward against a biasing force of the guide spring so as to establish the flow path between the plug and the socket,
the fitted portion of the guide is fitted about the distal end of the plug,
a first seal member is disposed between the fitted portion of the guide and an outer circumferential surface of the distal end of the plug,
the first end face of the movable valve of the plug and the second end face of the fixed valve of the socket abut to form a first abutment surface, and an end surface of the distal end of the plug and the stepped portion of the guide main body abut to form a second abutment surface that is flush with an entirety of the first abutment surface,
a second seal member is disposed between the fixed valve and a first sealing surface formed on an inner surface of the guide main body,
a third seal member is disposed between an outer circumferential surface of a front end of the movable valve and a second sealing surface formed on an inner surface of the distal end of the plug main body, such that the second and third seal members are disposed on axially opposite sides of the first abutment surface,
in the insertion state, the first sealing surface of the guide main body is flush with and forms a substantially cylindrical surface with the second sealing surface of the distal end of the plug main body, and said substantially cylindrical surface crosses a plane formed by the first and second abutment surfaces, and the first seal member is positioned adjacent to the first and second abutment surfaces.

2. The fluid coupling according to claim 1,
wherein an inner surface of the fitted portion of the guide is larger in diameter than an inner surface of the guide main body, and is continuous with the inner surface of the guide main body via the stepped portion which, in the insertion state, is engaged with the distal end of the plug, and wherein the first seal member includes two O-rings within the inner surface of the fitted portion.

3. The fluid coupling according to claim 1, wherein a fourth seal member is disposed between an outer circumference of the guide and the inner surface of the socket main body.

4. The fluid coupling according to claim 1, wherein the socket further includes a base that is fixed to the socket main body, the fixed valve being fixedly mounted to the base, wherein the guide spring is exposed in the flow path in the insertion state and the non-insertion state so that, in the connected state, a rear end of the guide abuts with the base to position the guide spring away from the flow path, and an inner circumferential surface of the rear end of the guide is flush with and continues with an inner circumferential surface of the base.

5. The fluid coupling according to claim 1, wherein the plug main body has an enlarged circumferential portion located rearwardly of the distal end of the plug, said enlarged circumferential portion having a larger circumference than said distal end of the plug, and the first seal member is mounted on the plug main body in a position such that the first seal member is disposed radially inwardly of a straight line extending from an outer circumferential corner portion of the distal end of the plug to an outer circumferential corner portion of the enlarged circumferential portion of the plug main body.

6. The fluid coupling according to claim 1, wherein the socket and the plug are configured such that, upon movement from the insertion state toward the connected state, the guide and the distal end of the plug main body are axially moved relative to the socket main body further rearward into the socket main body, and the fixed valve and the movable valve are axially moved relative to the plug main body further rearward into the plug main body, such that the first and second abutment surfaces are axially separated away from each other.

\* \* \* \* \*